(12) United States Patent
Graul et al.

(10) Patent No.: US 10,305,693 B2
(45) Date of Patent: May 28, 2019

(54) ANONYMOUS SECURE SOCKET LAYER CERTIFICATE VERIFICATION IN A TRUSTED GROUP

(71) Applicant: INTERNATIONAL BUSINESS MACHINES CORPORATION, Armonk, NY (US)

(72) Inventors: Karsten Graul, Schlaitdorf (DE); Marco H. Kroll, Boeblingen (DE); Jakob C. Lang, Weil im Schoenbuch (DE); Rene Trumpp, Geislingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 264 days.

(21) Appl. No.: 15/342,331

(22) Filed: Nov. 3, 2016

(65) Prior Publication Data

US 2018/0123802 A1    May 3, 2018

(51) Int. Cl.
*G06F 21/00* (2013.01)
*H04L 9/32* (2006.01)
(Continued)

(52) U.S. Cl.
CPC .......... *H04L 9/3263* (2013.01); *H04L 9/0861* (2013.01); *H04L 63/0281* (2013.01);
(Continued)

(58) Field of Classification Search
CPC ... H04L 9/3263; H04L 63/166; H04L 63/065; H04L 63/0407; H04L 63/06;
(Continued)

(56) References Cited

U.S. PATENT DOCUMENTS 8,037,300 B2  10/2011  Kaneda
8,275,991 B2   9/2012  Cahn
(Continued)

FOREIGN PATENT DOCUMENTS

CN    102594558 A    7/2012

OTHER PUBLICATIONS

Andrea Micheloni, et al.,"Laribus: Privacy-Preserving Detection of Fake SSL Certificates with a Social P2P Notary Network", EURASIP Journal on Information Security, Springer, Feb. 18, 2015, p. 1-10.

*Primary Examiner* — Kendall Dolly
(74) *Attorney, Agent, or Firm* — Cantor Colburn LLP; Steven Chiu

(57) ABSTRACT

Embodiments include method, systems and computer program products for anonymous secure socket layer (SSL) certificate verification in a trusted group. In some embodiments, a device associated with a user receiving a web server certificate from a web server. A message that includes the web server certificate and associated universal resource locator (URL) may be encrypted using a group key and a proxy key. The message may be transmitted to a proxy server. An anonymized request based on the message may be received from the proxy server. An encrypted response may be generated and transmitted to the proxy server. Encrypted and anonymized responses from members of a trusted group may be received. The responses may be processed and an action associated with the web server certificate may be facilitated.

17 Claims, 6 Drawing Sheets

(51) Int. Cl.
*H04L 29/06* (2006.01)
*H04L 9/08* (2006.01)

(52) U.S. Cl.
CPC ...... *H04L 63/0407* (2013.01); *H04L 63/0428* (2013.01); *H04L 63/06* (2013.01); *H04L 63/065* (2013.01); *H04L 63/0884* (2013.01); *H04L 63/166* (2013.01)

(58) Field of Classification Search
CPC ............ H04L 63/0281; H04L 63/0428; H04L 63/0884; H04L 9/0861
See application file for complete search history.

(56) References Cited

U.S. PATENT DOCUMENTS

| | | | |
|---|---|---|---|
| 8,316,237 B1 * | 11/2012 | Felsher | H04L 9/0825 380/282 |
| 8,407,464 B2 | 3/2013 | Salowey et al. | |
| 2014/0013110 A1 * | 1/2014 | Thoniel | H04L 9/083 713/156 |

\* cited by examiner

ANONYMOUS SECURE SOCKET LAYER CERTIFICATE VERIFICATION IN A TRUSTED GROUP

BACKGROUND

The present disclosure relates to data processing, and more specifically, to methods, systems and computer program products for anonymous secure socket layer (SSL) certificate verification in a trusted group.

Transport Layer Security (TLS) and its predecessor, Secure Sockets Layer (SSL), (both frequently referred to as "SSL"), are cryptographic protocols that provide communications security over a computer network. The protocols may be used in applications, such as web browsing, email, Internet faxing, instant messaging, and voice-over-IP (VoIP), to secure all communications between their servers and clients (e.g. web browsers).

Client-server applications may use SSL protocols to communicate across a network in a way designed to prevent eavesdropping and tampering. A web server may send a requesting device a digital certificate. The certificate may contain the server name, the trusted certificate authority (CA), and the server's public encryption key.

The client device may confirm the validity of the certificate before proceeding with loading the requested web page. However, if the interaction with the web server is first for the client device, the client device may not be able to verify whether the certificate is from the website or from a malicious third party.

SUMMARY

In accordance with an embodiment, a method for anonymous secure socket layer (SSL) certificate verification in a trusted group is provided. The method may include receiving, by a device associated with a user, a web server certificate from a web server, wherein the user is associated with a trusted group. A message comprising the web server certificate and associated universal resource locator (URL) may be encrypted using a group key and a proxy key. The message may be transmitted to a proxy server. An anonymized request may be received from the proxy server based on the message. The anonymized request may be processed. An encrypted response may be generated based on the processing. The encrypted response may be transmitted to the proxy server. The encrypted and anonymized responses may be received from members of the trusted group. The encrypted and anonymized responses from the members of the trusted group may be processed. An action associated with the web server certificate may be facilitated based on the processing of the encrypted and anonymized responses.

In another embodiment, a computer program product may comprise a non-transitory storage medium readable by a processing circuit that may store instructions for execution by the processing circuit for performing a method that may include receiving, by a device associated with a user, a web server certificate from a web server, wherein the user is associated with a trusted group. A message comprising the web server certificate and associated universal resource locator (URL) may be encrypted using a group key and a proxy key. The message may be transmitted to a proxy server. An anonymized request may be received from the proxy server based on the message. The anonymized request may be processed. An encrypted response may be generated based on the processing. The encrypted response may be transmitted to the proxy server. The encrypted and anonymized responses may be received from members of the trusted group. The encrypted and anonymized responses from the members of the trusted group may be processed. An action associated with the web server certificate may be facilitated based on the processing of the encrypted and anonymized responses.

In another embodiment, a system may include a processor in communication with one or more types of memory. The processor may be configured to receive, by a device associated with a user, a web server certificate from a web server, wherein the user is associated with a trusted group. A message comprising the web server certificate and associated universal resource locator (URL) may be encrypted using a group key and a proxy key. The message may be transmitted to a proxy server. An anonymized request may be received from the proxy server based on the message. The anonymized request may be processed. An encrypted response may be generated based on the processing. The encrypted response may be transmitted to the proxy server. The encrypted and anonymized responses may be received from members of the trusted group. The encrypted and anonymized responses from the members of the trusted group may be processed. An action associated with the web server certificate may be facilitated based on the processing of the encrypted and anonymized responses.

BRIEF DESCRIPTION OF THE DRAWINGS

The forgoing and other features, and advantages of the disclosure are apparent from the following detailed description taken in conjunction with the accompanying drawings in which.

DETAILED DESCRIPTION

In accordance with exemplary embodiments of the disclosure, methods, systems and computer program products for anonymous secure socket layer (SSL) certificate verification in a trusted group are provided.

A trusted group may be created for a group of users. Within the group, a group encryption key, specific to members of the trusted group and an authentication key for a proxy server (e.g., proxy key) may be generated and shared. Client devices associated with the trusted group may communicate with a proxy server. The proxy server may be responsible for managing communications between a sender from a trusted group and the members of the trusted group. The proxy server does not have access to the group encryption key.

A member of the trusted group may wish to access a website. The member may use a client device to communicate with a web server. The user may obtain a web server certificate (e.g., SSL certificate) and the client device may encrypt the certificate and the universal resource locator (URL) associated with the certificate using the group encryption key. The client device may then generate a message containing the encrypted certificate and encrypted universal resource locator (URL) associated with the certificate and encrypt the message using the proxy key. The proxy server may receive the message from the user. The message may be decrypted using the proxy key and anonymized (e.g. removing identifying information associated with the user who sent the request). The proxy server may then encrypt the anonymized message using the proxy key and transmit the encrypted and anonymized message containing the encrypted certificate to each member of the trusted group.

Each member of the trusted group may receive the message from the proxy server and may decrypt the message using the proxy key and decrypt the certificate and URL using the group encryption key. Each member of the trusted group may respond to the message indicating their response to the certificate (e.g., VALID, INVALID, UNKNOWN) and may encrypt it using the group encryption key. The client device of each member of the trusted group may encrypt the generated encrypted response using the proxy key and may transmit the response to the proxy server. The proxy server may then decrypt the response, anonymize it, encrypt it using the proxy key, and then transmit the responses to each member of the trusted group. The member of the trusted group that initiated the process may then receive the responses from the proxy server on their client device and may analyze the responses. Based on the responses received (e.g., number of responses, type of response, etc.), the member may take an action associated with the certificate. If the client device determines that the web server certificate can be trusted, the web page associated with the certificate may be loaded. If the client device determines that the web server certificate cannot be trusted, an empty page or error page may be displayed instead.

Figure 1:
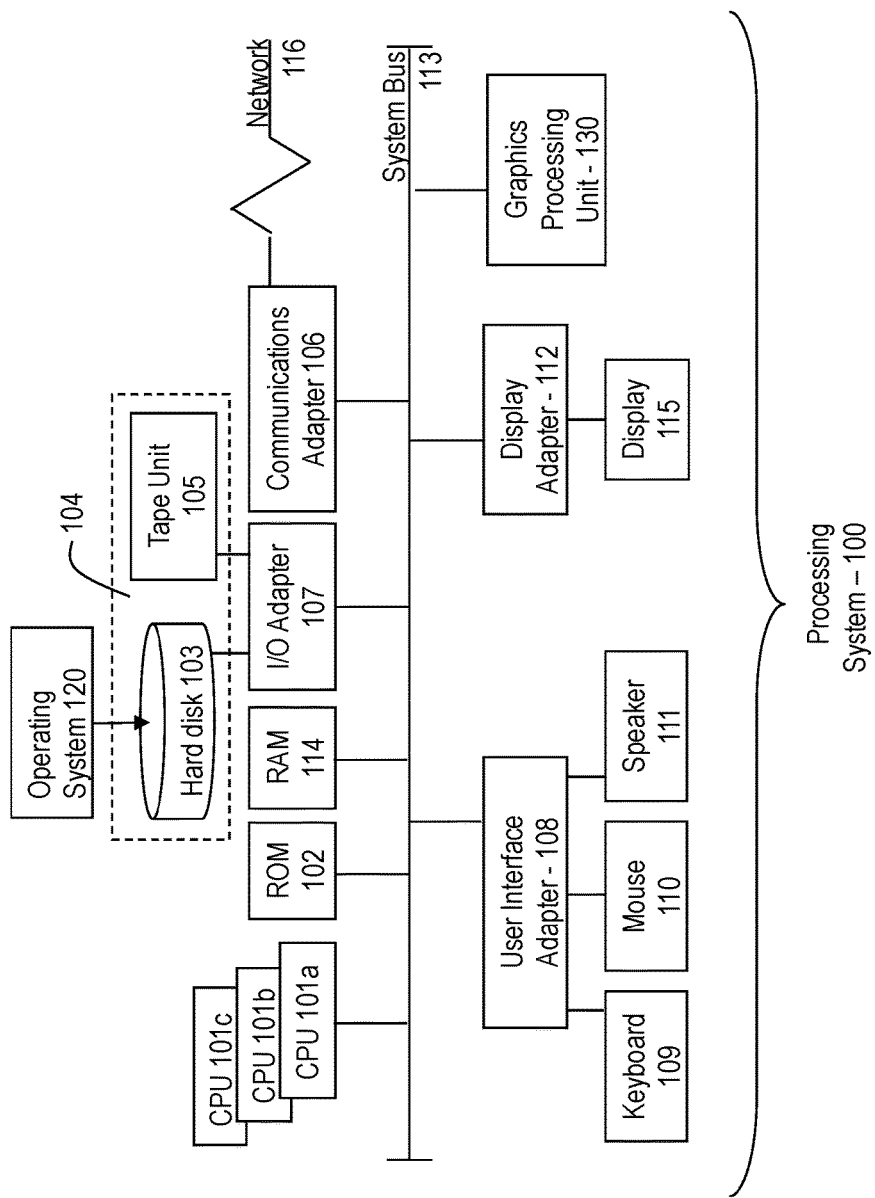
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a communications adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A communications adapter 106 interconnects bus 113 with an outside network 116 enabling data processing system 100 to communicate with other such systems. A screen (e.g., a display monitor) 115 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnect to bus 113 via user interface adapter 108, which may include, for example, a Super I/O chip integrating multiple device adapters into a single integrated circuit.

In exemplary embodiments, the processing system 100 includes a graphics-processing unit 130. Graphics processing unit 130 is a specialized electronic circuit designed to manipulate and alter memory to accelerate the creation of images in a frame buffer intended for output to a display. In general, graphics-processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
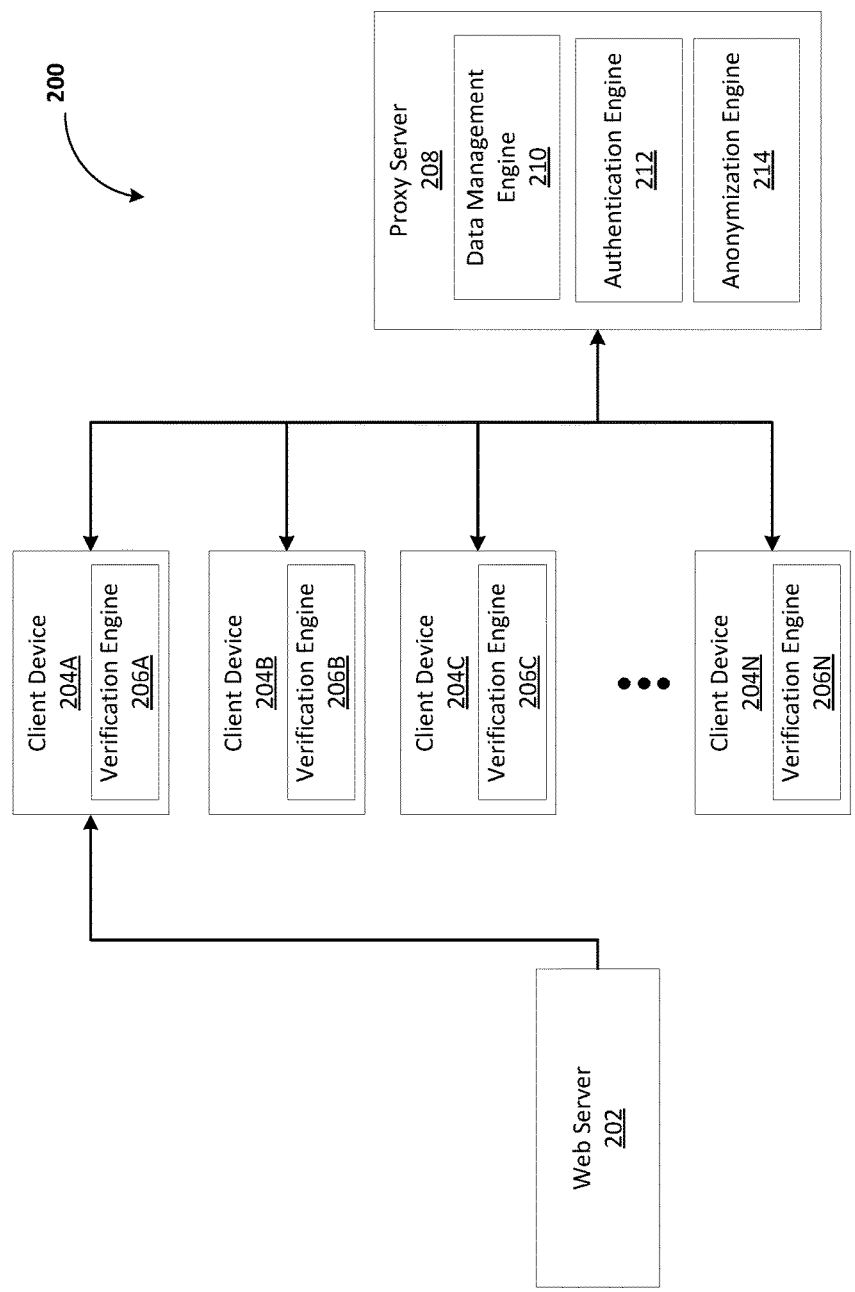
FIG. 2 is a block diagram illustrating a computing system in accordance with an exemplary embodiment.

Referring now to FIG. 2, a computing system 200 in accordance with an embodiment is illustrated. As illustrated, the computing system 200 may include, but is not limited to, a web server 202, a group of client devices (204A, 204B, 204C, 204N, collectively referred to as "204") and/or a proxy server 208. In some embodiments, the client device(s) 204 may include a respective verification engine (206A, 206B, 206C, 206N, collectively referred to as "206). In some embodiments, the proxy server 208 may include a data management engine 210, an authentication engine 212, and/or an anonymization engine 214.

In some embodiments, the web server 202 may be any type of computing device, such as a computer, laptop, server, etc. capable of hosting a website and implementing security measures such as SSL certificates. The web server 202 may communicate with one or more client devices 204 to provide data to load webpages on a client device 204.

In some embodiments, the client device 204 may be any type of computing device with network access, such as a computer, laptop, server, tablet, smartphone, wearable computing devices, or the like. Each client device may have a respective verification engine 206 and a local datastore (not pictured).

The verification engine 206 may include computer-readable instructions that in response to execution by the processor(s) 101, cause operations to be performed including identifying and maintaining membership in a trusted group. In some embodiments, this may include storing a list of members of the trusted group (e.g., identifiers associated with the members, client devices associated with the members, etc.), generating a group encryption key associated with the trusted group, and generating a proxy key used to authenticate members of the trusted group to the proxy server 208. The verification engine 206 may be responsible for storing the group encryption key and the proxy key in the local datastore. The verification engine 206 may receive an indication from the user to verify a web server certificate received from a web server 202. The verification engine 206 may encrypt the web server certificate and encrypt the URL using the group encryption key and may generate a message that includes the encrypted web server certificate, associated URL, and additional information. The additional information may include, for example, a random number, timestamp, and/or hash that may be used to identify any attempts of duplication and/or manipulation. The verification engine 206 may encrypt the message using the proxy key and may transmit the message to the proxy server 208.

The verification engine 206 may then receive an anonymized and encrypted request based on the message sent and may decrypt the message using the proxy key. The verification engine 206 may then process the request. In some embodiments, the verification engine 206 may decrypt the web server certificate and URL using the group encryption key and generate a response indicating that they user believes the certificate is VALID, INVALID, or UNKNOWN to them. The response may then be encrypted using the group key. The encrypted response may then be encrypted with the proxy key and transmitted to the proxy server 208.

The verification engine 206 may receive anonymized responses from different members of the trusted group. Based on the responses received, the user of the client device 204 may determine to trust the certificate and load the webpage. In some embodiments, the user may choose not to trust the certificate and the client device 204 may be directed to display an empty page or an error page.

In some embodiments, a proxy server 208 may be provided. In some embodiments, a single proxy server 208 may be used. In some embodiments, multiple proxy servers 208 may be used. The proxy server 208 may be any type of computing device, such as a laptop, computer, server, smartphone, tablet, or the like. The proxy server 208 may include a data management engine 210, an authentication engine 212, and/or an anonymization engine 214. The data management engine 210 may include computer-readable instructions that in response to execution by the processor(s) 101, cause operations to be performed including receiving requests from one or more client devices 204. The data management engine 210 may determine that the sender of the message is associated with a trusted group. The data management engine 210 may transmit the encrypted message and proxy key to the authentication engine 212 for further processing. The data management engine 210 may receive from the authentication engine 212, an encrypted anonymized message containing the encrypted web server certificate and encrypted URL and may transmit the encrypted anonymized message to each member of the identified trusted group. The data management engine 210 may receive encrypted responses from members of the trusted group and may transmit the responses to the authentication engine 212 for further processing. The data management engine 210 may receive the processed responses from the authentication engine 212 and may transmit the processed responses (e.g., each anonymized and encrypted using the proxy key) to each member of the trusted group.

The authentication engine 212 may include computer-readable instructions that in response to execution by the processor(s) 101, cause operations to be performed including receiving an encrypted message or response from the data management engine 210 and identification of a trusted group associated with the encrypted message or response. The authentication engine 212 may retrieve the proxy key associated with the trusted group and may use the proxy key to decrypt the message or response. The authentication engine 212 may then transmit the decrypted message or response to the anonymization engine 214 to anonymize the message or response. The authentication engine 212 may receive the anonymized message or response and may encrypt the anonymized message or response using the proxy key. The encrypted and anonymized message or response may then be transmitted to the data management engine 210 for distribution to members of the trusted group.

The anonymization code engine 214 may include computer-readable instructions that in response to execution by the processor(s) 101 cause operations to be performed including receiving a decrypted message or response and removing identifying information from the message or response. Upon removal of any identifying information (e.g., user name, email, client device identifier, etc.), the message or response may be transmitted back to the authentication engine 212 for encryption using the proxy key.

Figure 3:
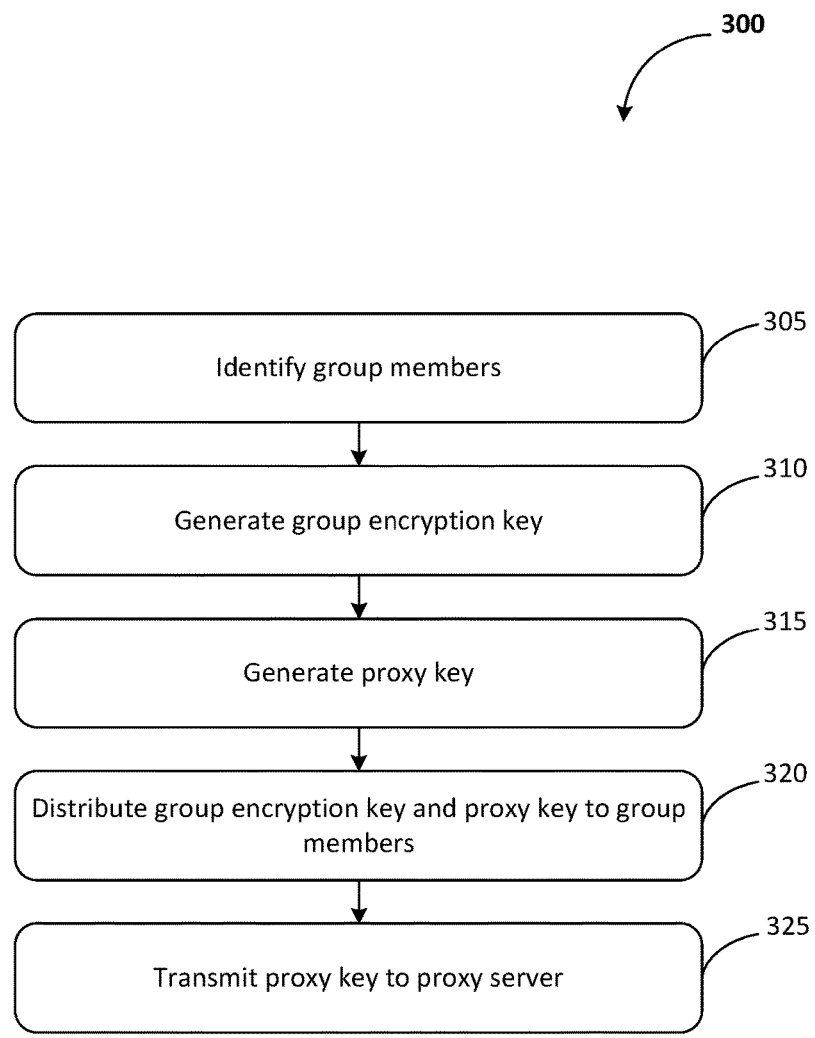
FIG. 3 is a flow diagram of a method for creating a trusted group in accordance with an exemplary embodiment.

Now referring to FIG. 3, a flow diagram of a method 300 for creating a trusted group in accordance with an exemplary embodiment is depicted. At block 305, group members for a trusted group may be identified. In some embodiments, users may be added to a group based on a characteristic associated with the user (e.g., position in company, division in company, etc.). In some embodiments, users may be manually added by another member of the group. In some embodiments, a user may request to join a trusted group.

At block 310, a group encryption key may be generated. In some embodiments, any member of the trusted group may generate the group encryption key. In some embodiments, verification engines 206 of the respective client devices 204 associated with the members of the trusted group that are online may generate a portion of the group encryption key and one of the verification engines 206 may collect the generated portions of the group encryption key and generate the group encryption key. In other embodiments a group admin may generate the group key and distribute it amongst the group members.

At block 315, a proxy key may be generated. In some embodiments, any member of the trusted group may generate the proxy key. In some embodiments, verification engines 206 of the respective client devices 204 associated with the members of the trusted group that are online may generate a portion of the proxy key and one of the verification engines 206 may collect the generated portions of the proxy key and generate the proxy key.

At block 320, the group encryption key and the proxy key may be distributed to members of the trusted group. In some embodiments, the group encryption key and the proxy key may be distributed using different distribution methods. Examples of distribution methods may include email, a chat client, or distribution of a letter to each member.

At block 325, the proxy key may be transmitted to the proxy server 208. In some embodiments, the client device 204 may establish a secure connection with the proxy server 208 and may transmit the proxy key over the secure connection.

In some embodiment, if a proxy key or group encryption key has been compromised (e.g., accidently made public or transmitted outside of the trusted group) or if a member of the trusted group decides to leave the group (e.g., employee quits the company, moves to a different position, etc.), a new group encryption key and/or proxy key may be generated and distributed accordingly. In some embodiments, the group encryption key and/or the proxy key may be regenerated when a threshold has been met. For example, the threshold may be a time threshold and a new group encryption key and/or proxy key may be generated periodically based on the threshold (e.g., weekly, monthly, etc.). In some embodiments, the threshold may be associated with the size of the trusted group, where if X number of new members are added, a new group encryption key and/or proxy key may be generated.

Figure 4A:
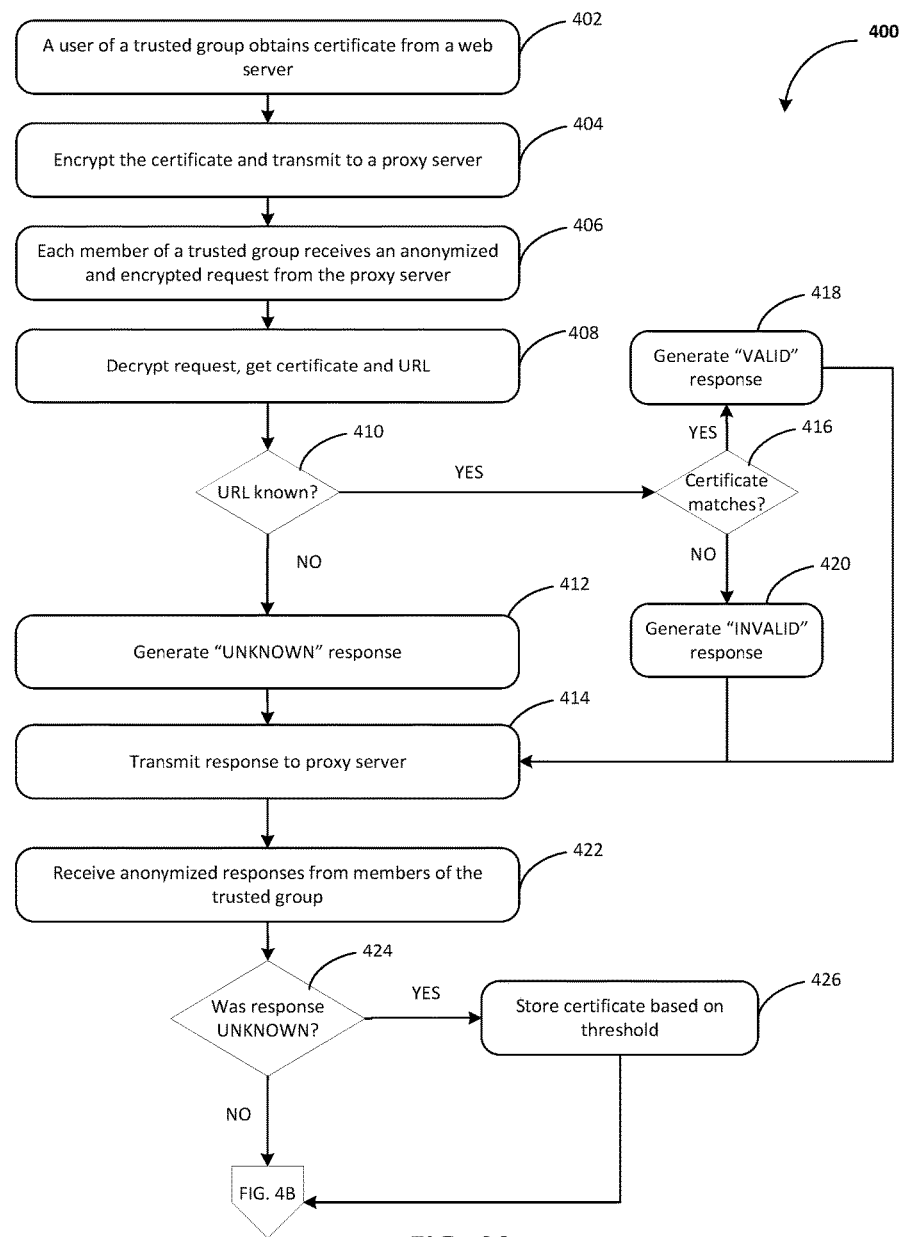
FIGS. 4A and 4B are a flow diagram of a method for group based SSL certificate verification in accordance with an exemplary embodiment.
Figure 4B:
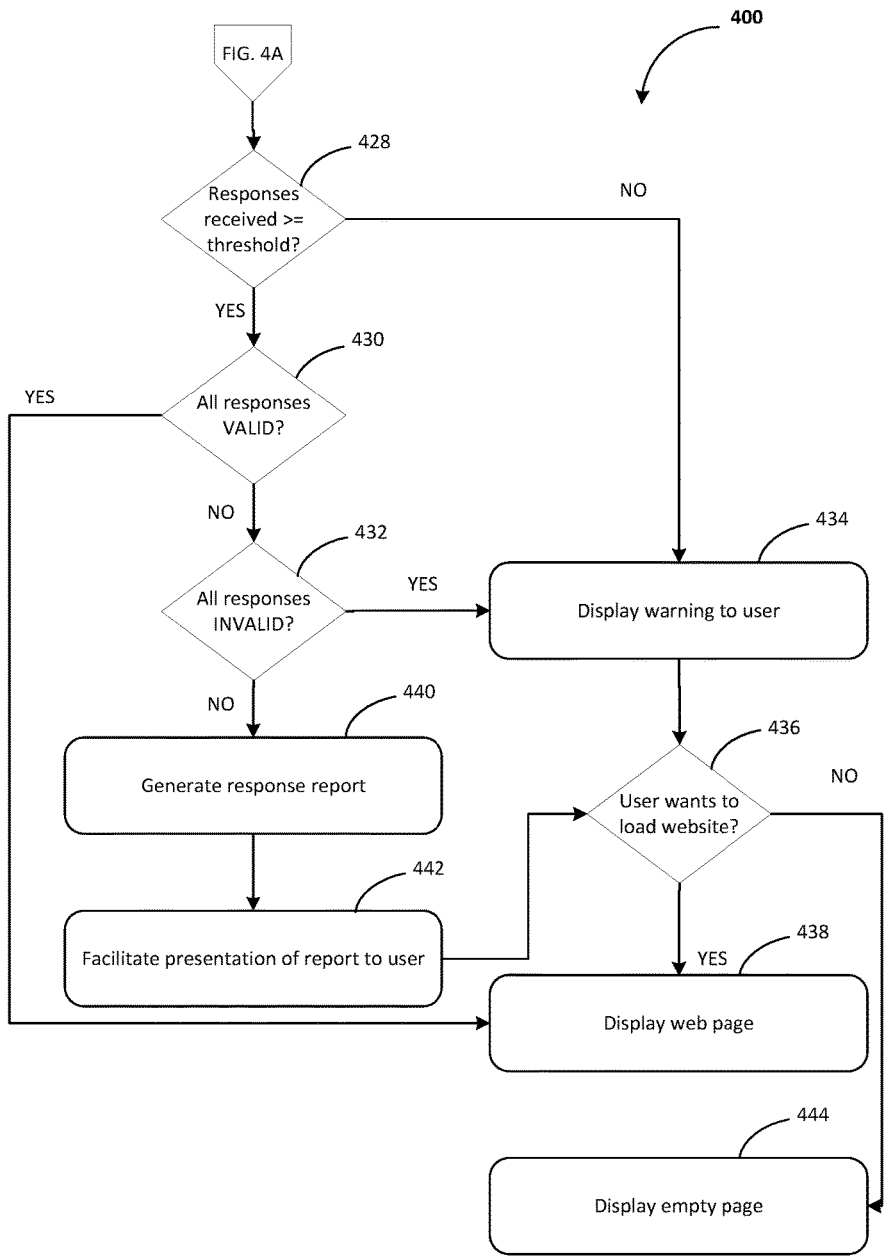

Now referring to FIG. 4A-4B, a flow diagram of a method 400 for group based SSL certificate verification in accordance with an exemplary embodiment is depicted. At block 402, a client device 204 associated with a user of a trusted group may obtain a certificate (e.g., web server certificate, SSL certificate, etc.) from a web server 202.

At block 404, the client device 204 may encrypt the certificate and transmit to a proxy server 208. In some embodiments, the verification engine 206 of the client device may encrypt the certificate and URL using a group encryption key associated with the trusted group, of which the user is a member. The verification engine may then generate a message that includes the encrypted certificate and the encrypted URL associated with the certificate. In some embodiments, additional data may be included in the message, such as a random number, timestamp, and/or a hash, so that any attempts of duplication and/or manipulation may be detected. The verification engine 206 may encrypt the generated message using the proxy key and transmit the encrypted message to a proxy server 208 for processing.

At block 406, each member of a trusted group may receive an anonymized and encrypted request from the proxy server 208. After receiving the request from the user, the proxy server 208 may have processed the message or request (further described in relation to FIG. 5) and transmit an anonymized and encrypted request for certificate verification to each member of the trusted group.

At block 408, the received request may be decrypted and the certificate and URL may be obtained from the request. Client devices 204 associated with the members of the trusted group may receive the encrypted and anonymized request. The verification engine 206 of the respective client devices 204 may decrypt the received request using the proxy key and may decrypt the certificate and URL using the group encryption key.

At block 410, a determination may be made whether the URL from the request is known to the client device 204. In some embodiments, the verification engine 206 of the client device 204 may check a local datastore to see if the URL is present. In some embodiments, the verification engine 206 may check a list or other data structure to determine whether the URL is known to the client device 204. If the URL is known, the method may proceed to block 416.

At block 416 a determination is made to see if the unencrypted web server certificate matches one that is stored locally (e.g., in a local datastore of the client device 204). If the web server certificate matches the one stored locally, then the method may proceed to block 418, where a response indicating "VALID" is generated by the verification engine 206. If, at block 416, the web server certificate does not match the one stored locally, the method may proceed to block 420, where a response indicating "INVALID" is generated by the verification engine 206. From blocks 418 and 420, the method may proceed to block 414.

If, at block 410, a determination is made that the URL is not known, the method may proceed to block 412. The method may proceed to block 412, where the verification engine 206 of the client device 204 may generate an "UNKNOWN" response.

At block 414 (from blocks 412, 418, or 420), the response generated by the respective verification engines 206 of the client devices 204 associated with members of the trusted group may be transmitted to the proxy server 208.

At block 422, members of the trusted group may receive anonymized responses from member of the trusted group. The anonymized and encrypted responses may have been processed by the proxy server 208, as described in the context of FIG. 5, described below.

At block 424, a determination may be made whether the response was "UNKNOWN." The verification engine 206 may process the response to determine whether it is "UNKNOWN." If the response is "UNKNOWN," then the method may proceed to block 426. In some embodiments, at block 426, the client device 204 may store the certificate based on a threshold. The certificate may be stored in a local data store. In some embodiments, the threshold may specify a number of invalid responses and valid responses received (e.g., no valid responses and at least one valid response). The threshold may be adjusted by the user of the client device 204.

If at block 424, the response is not "UNKNOWN" (e.g., it is "KNOWN"), then the method may proceed to block 428.

The method may proceed to block 428 in FIG. 4B. At block 428, a determination may be made to determine whether the responses received are greater or equal to a predetermined threshold. The predetermined threshold may be indicative of a number of responses that should be received before processing them. In some embodiments, the predetermined threshold may be indicative of a minimum number of responses of a certain type (e.g., at least 2 VALID responses, at least 2 INVALID responses, etc.).

If the responses are not greater or equal to the predetermined threshold, the method may proceed to block 434, where a warning message is displayed to the user of the client device 204. The method may then proceed to block 436.

If at block 428, a determination is made that the responses are greater or equal to the predetermined threshold, the method may proceed to block 430.

At block 430, a determination is made whether all responses are VALID. If all the responses received from the proxy server 208 indicate that the certificate is VALID, then at block 438, the web page is displayed on the client device 204. If at block 430, a determination is made that all responses are not VALID, then the method may proceed to block 432.

At block 432, a determination whether all responses are INVALID may be made. If all the responses received from the proxy server 208 indicate that the certificate is INVALID, then at block 434, a warning message is displayed on the client device 204. The method may then proceed to block 436.

If at block 432, a determination is made that not all the responses are INVALID, then the method may proceed to block 440, where the verification engine 206 may generate a report that reflects the number of received responses that are VALID, INVALID, and UNKNOWN. The method may proceed to block 442, where the verification engine 206 may facilitate presentation of the report to the user. The method may proceed to block 436.

At block 436 (which may be arrived to from blocks 434 and 442), a determination may be made whether the user want to load the website. In some embodiments, the user may view a report and/or warning presented by the verification engine 206 and may indicate to the verification engine 206 whether they want to load the website associated with the web server certificate.

If at block 436, the user indicates to the verification engine 206 that they wish to load the website, the method may proceed to block 438, where the web page is displayed on the client device 204. If at block 436, the user indicates to the verification engine that they do not wish to load the website, then at block 444, an empty page or error page may be displayed on the client device 204.

Figure 5:
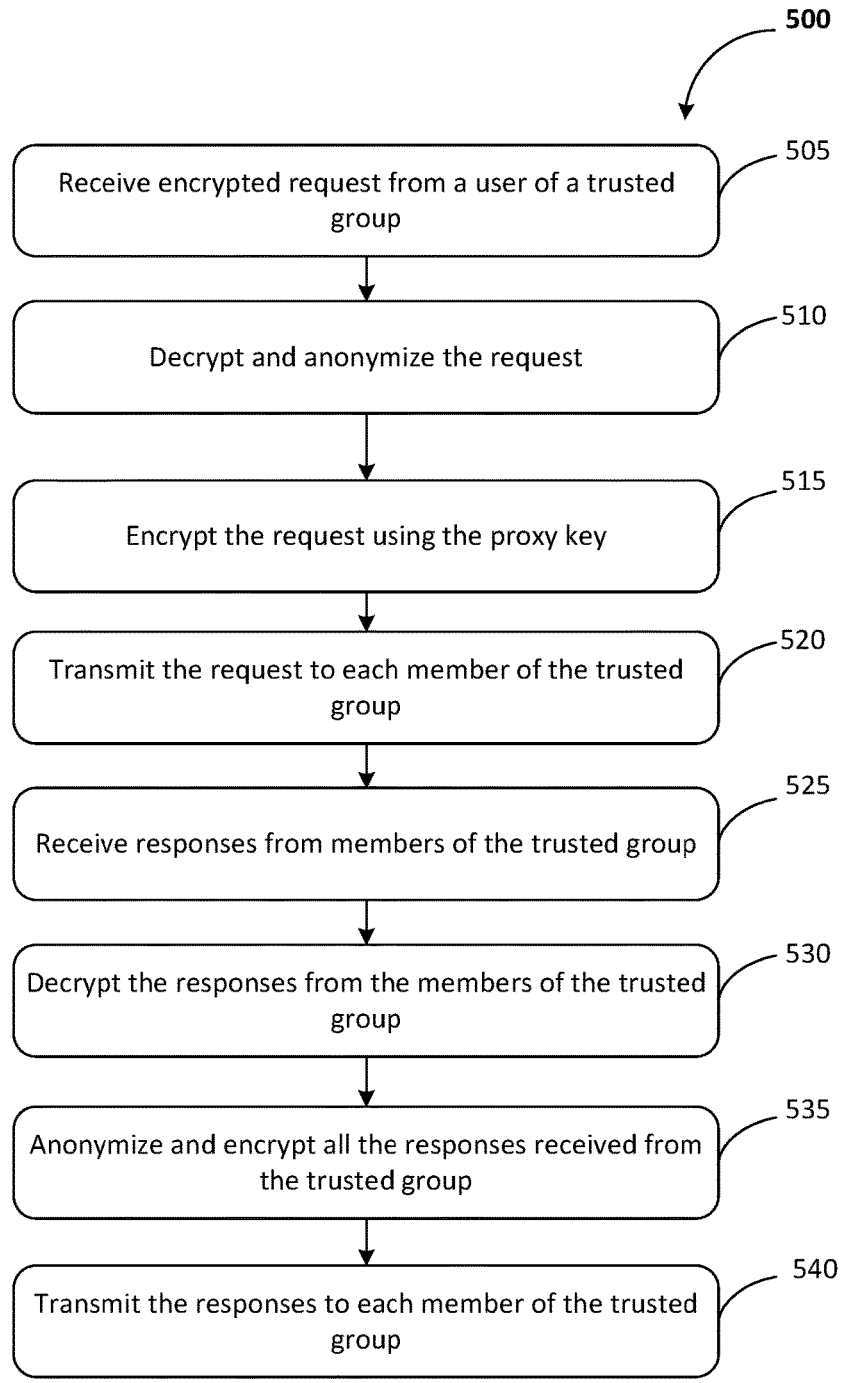
FIG. 5 is a flow diagram of a method for group based SSL certificate verification in accordance with an exemplary embodiment.

Now referring to FIG. 5, a flow diagram of a method for group based SSL certificate verification in accordance with an exemplary embodiment is depicted. At block 505, an encrypted request may be received from a user of a trusted group. In some embodiments, the data management engine 210 may receive the encrypted message from a user of a trusted group, requesting anonymous verification of a web server certificate. The data management engine 210 may identify the trusted group based on information received in the encrypted request (e.g., user identifier, computing device identifier, etc.).

At block 510, the request may be decrypted and anonymized. In some embodiments, the authentication engine 212 may obtain and/or retrieve the proxy key associated with the trusted group and may decrypt the received message or response. The authentication engine 212 may transmit the decrypted message or response to the anonymization engine 214. The anonymization engine 214 may remove any identifying information in the message or request and may transmit the anonymized message back to the authentication engine 212.

At block 515, the authentication engine 212 may encrypt the anonymized message or request using the proxy key and transmit the encrypted anonymized message or request to the data management engine 210.

At block 520, the request may be transmitted to each member of the trusted group. In some embodiments, the data management engine 210 may transmit the encrypted and anonymized message or request to each member of the trusted group. In some embodiments, the encrypted and anonymized messages may be transmitted to each member of the trusted group over secure connection with the respective client devices 204 associated with the members of the trusted group.

At block 525, responses may be received from members of the trusted group. In some embodiments, the responses may be received from members of the trusted group. The responses may have been encrypted using the proxy key by the respective verification engines 206 of each of the client devices 204.

At block 530, the authentication engine 212 may decrypt the responses from the members of the trusted group using the proxy key. The data management engine 210 may process the responses received from members of the trusted group by identifying responses received as being associated with a particular trusted group. The data management engine 210 may transmit the encrypted messages to the authentication engine 212. The authentication engine 212 may obtain or retrieve the proxy key associated with the trusted group, may decrypt the responses, and may transmit the decrypted messages to the anonymization engine 214

At block 535, the responses received from the trusted group may be anonymized and encrypted. The anonymization engine 214 may receive the decrypted responses from the authentication engine 212, which removed any identifying information that may have been contained in the response. The anonymization engine 214 may then transmit the anonymized responses back to the authentication engine 212. In some embodiments, the authentication engine 212 may encrypt the anonymized responses using the proxy key.

At block 540, the anonymized and encrypted responses may be transmitted to each member of the trusted group. The responses may be transmitted to each member of the trusted group by the data management engine 210 as they are processed and encrypted The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for anonymous secure socket layer (SSL) certificate verification in a trusted group, the method comprising:
   receiving, by a device associated with a user, a web server certificate from a web server, wherein the user is associated with a trusted group;
   encrypting a message comprising the web server certificate and associated universal resource locator (URL), wherein the web server certificate and associated URL are encrypted using a group encryption key, and wherein the message is encrypted using a proxy key;
   transmitting the message to a proxy server;
   receiving an anonymized request from the proxy server based on the message, wherein the anonymized request comprises the encrypted web server certificate, and wherein receiving an anonymized request comprises decrypting the message using the proxy key and decrypting the encrypted web server certificate and the encrypted URL using the group encryption key;
   processing the anonymized request;
   generating an encrypted response based on the processing;
   transmitting the encrypted response to the proxy server, wherein the response is encrypted using the proxy key;
   receiving encrypted and anonymized responses from members of the trusted group, wherein the trusted group is associated with the group encryption key and the proxy key, and wherein the responses from the members are encrypted using the proxy key;
   processing encrypted and anonymized responses from the members of the trusted group; and
   facilitating an action associated with the web server certificate based on the processing of the encrypted and anonymized responses.

2. The computer-implemented method of claim 1, further comprising:
   determining a number of encrypted and anonymized responses received;
   comparing the number to a predetermined threshold; and
   determining the number is greater or equal to the predetermined threshold.

3. The computer-implemented method of claim 2, wherein the user is a first user associated with a first predetermined threshold and a second user of the trusted group is associated with a second predetermined threshold, and wherein the first predetermined threshold and the second predetermined threshold are not equal.

4. The computer-implemented method of claim 1, wherein the action associated with the web server certificate is facilitating display of a webpage associated with the URL or facilitating display of an empty page.

5. The computer-implemented method of claim 1, wherein the trusted group is associated with a group encryption key and the method further comprises:
   identifying group members of the trusted group;
   generating the group encryption key;
   generating the proxy key;
   distributing the group encryption key and the proxy key to each member of the trusted group; and
   transmitting the proxy key to the proxy server.

6. The computer-implemented method of claim 1, wherein the message further comprises at least one of a random number, a timestamp, and a hash.

7. A computer program product, the computer program product comprising a computer readable storage medium having program instructions embodied therewith, the instructions when executed by a processor to cause the processor to:

receive, by a device associated with a user, a web server certificate from a web server, wherein the user is associated with a trusted group;

encrypt a message comprising the web server certificate and associated universal resource locator (URL), wherein the web server certificate and associated URL are encrypted using a group encryption key, and wherein the message is encrypted using a proxy key;

transmit the message to a proxy server;

receive an anonymized request from the proxy server based on the message, wherein the anonymized request comprises the encrypted web server certificate, and wherein receiving an anonymized request comprises decrypting the message using the proxy key and decrypting the encrypted web server certificate and the encrypted URL using the group encryption key;

process the anonymized request; generate an encrypted response based on the processing;

transmit the encrypted response to the proxy server, wherein the response is encrypted using the proxy key;

receive encrypted and anonymized responses from members of the trusted group wherein the trusted group is associated with the group encryption key and the proxy key, wherein the responses from the members are encrypted using the proxy key;

process encrypted and anonymized responses from the members of the trusted group; and facilitate an action associated with the web server certificate based on the processing of the encrypted and anonymized responses.

8. The computer program product of claim 7, the instructions further causing the processor to:

determine a number of encrypted and anonymized responses received;

compare the number to a predetermined threshold; and determine the number is greater or equal to the predetermined threshold.

9. The computer program product of claim 8, wherein the user is a first user associated with a first predetermined threshold and a second user of the trusted group is associated with a second predetermined threshold, and wherein the first predetermined threshold and the second predetermined threshold are not equal.

10. The computer program product of claim 7, wherein the action associated with the web server certificate is facilitating display of a webpage associated with the URL or facilitating display of an empty page.

11. The computer program product of claim 7, wherein the trusted group is associated with a group encryption key and the method further comprises the instructions further cause the processor to:

identify group members of the trusted group;

generate the group encryption key;

generate the proxy key;

distribute the group encryption key and the proxy key to each member of the trusted group; and transmit the proxy key to the proxy server.

12. The computer program product of claim 7, wherein the message further comprises at least one of a random number, a timestamp, and a hash.

13. A system, comprising:

a processor;

a memory in communication with the processor and storing instructions, which when executed by the processor, cause the processor to:

receive, by a device associated with a user, a web server certificate from a web server, wherein the user is associated with a trusted group;

encrypt a message comprising the web server certificate and associated universal resource locator (URL), wherein the web server certificate and associated URL are encrypted using a group encryption key, and wherein the message is encrypted using a proxy key;

transmit the message to a proxy server;

receive an anonymized request from the proxy server based on the message, wherein the anonymized request comprises the encrypted web server certificate, and wherein receiving an anonymized request comprises decrypting the message using the proxy key and decrypting the encrypted web server certificate and the encrypted URL using the group encryption key;

process the anonymized request;

generate an encrypted response based on the processing;

transmit the encrypted response to the proxy server, wherein the response is encrypted using the proxy key;

receive encrypted and anonymized responses from members of the trusted group wherein the trusted group is associated with the group encryption key and the proxy key, and wherein the responses from the members are encrypted using the proxy key;

process encrypted and anonymized responses from the members of the trusted group; and facilitate an action associated with the web server certificate based on the processing of the encrypted and anonymized responses.

14. The system of claim 13, wherein the processor is further configured to:

determine a number of encrypted and anonymized responses received;

compare the number to a predetermined threshold; and determine the number is greater or equal to the predetermined threshold.

15. The system of claim 13, wherein the action associated with the web server certificate is to facilitate display of a webpage associated with the URL or to facilitate display of an empty page.

16. The system of claim 13, wherein the trusted group is associated with a group encryption key and wherein the processor is further configured to:

identify group members of the trusted group;

generate the group encryption key;

generate the proxy key;

distribute the group encryption key and the proxy key to each member of the trusted group; and transmit the proxy key to the proxy server.

17. The system of claim 13, wherein the message further comprises at least one of a random number, a timestamp, and a hash.

* * * * *